United States Patent
Park et al.

(10) Patent No.: US 8,046,033 B2
(45) Date of Patent: Oct. 25, 2011

(54) MOBILE TERMINAL

(75) Inventors: Sang-Yool Park, Seoul (KR);
Moon-Pyoung Kim, Gyeonggi-Do (KR); Tae-Wan Kim, Gyeonggi-Do (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 498 days.

(21) Appl. No.: 12/205,449

(22) Filed: Sep. 5, 2008

(65) Prior Publication Data
US 2009/0075692 A1   Mar. 19, 2009

(30) Foreign Application Priority Data

Sep. 17, 2007   (KR) .................. 10-2007-0094364
Nov. 27, 2007   (KR) .................. 10-2007-0121743
Jan. 15, 2008   (KR) .................. 10-2008-0004600

(51) Int. Cl.
*H04M 1/00* (2006.01)

(52) U.S. Cl. ................ 455/575.1; 455/575.4
(58) Field of Classification Search ........... 455/575.1, 455/575.4
See application file for complete search history.

(56) References Cited

U.S. PATENT DOCUMENTS

| | | | | |
|---|---|---|---|---|
| 7,428,430 B2* | 9/2008 | Ahn et al. | .................. | 455/575.4 |
| 7,433,710 B2* | 10/2008 | Bodnar et al. | .............. | 455/556.1 |
| 2004/0179330 A1* | 9/2004 | Lee et al. | ...................... | 361/679 |
| 2004/0209642 A1* | 10/2004 | Kim | ........................... | 455/550.1 |
| 2005/0130720 A1* | 6/2005 | Finke-Anlauff | ........... | 455/575.3 |
| 2005/0136998 A1* | 6/2005 | Spence et al. | ............. | 455/575.3 |
| 2005/0137001 A1* | 6/2005 | Bell et al. | ................... | 455/575.4 |
| 2007/0076118 A1* | 4/2007 | Chiang | ......................... | 348/375 |
| 2008/0051163 A1* | 2/2008 | Kim et al. | ................. | 455/575.4 |

* cited by examiner

*Primary Examiner* — Nick Corsaro
*Assistant Examiner* — Munsoon Choo
(74) *Attorney, Agent, or Firm* — Birch, Stewart, Kolasch & Birch, LLP

(57) ABSTRACT

A mobile terminal including an upper body having an upper surface, a display located at the upper body, a lower body having first and second upper surfaces, the upper body being connected to the lower body for movement between a closed configuration in which the upper body completely covers the second upper surface and an open configuration in which the upper body partially covers the second upper surface to expose a portion of the second upper surface, the upper surface of the upper body being substantially co-planar to the first upper surface of the second body in the open and closed configuration, a first camera located at one of the upper body and the lower body, and at least one camera-dedicated key located at said portion of the second upper surface exposed in the open configuration, the at least one camera-dedicated key being configured to control the first camera.

36 Claims, 16 Drawing Sheets

MOBILE TERMINAL

CROSS-REFERENCE TO RELATED APPLICATIONS

The present application claims priority to Korean Applications No. 10-2007-0094364, filed on Sep. 17, 2007, No. 10-2007-0121743, filed on Nov. 27, 2007, and No. 10-2008-0004600, filed on Jan. 15, 2008, the entire contents of which is hereby incorporated by reference in their entireties.

BACKGROUND OF THE INVENTION

1. Field of the Invention

The present invention relates to a mobile terminal, and more particularly, to a mobile terminal having a camera.

2. Description of Related Art

A mobile terminal is a device that can be carried around and provides one or more functions such as voice and video call communication, inputting and outputting information, storing data, and the like. Recently, the functions supported by the mobile terminal have become more diversified, and more sophisticated, such as capturing images or video, reproducing music or video files, playing games, receiving broadcast signals, and the like. By integrating all of these additional functions, the mobile terminal may be embodied in the form of a multimedia player.

In order to implement the various functions of the multimedia player, the multimedia player requires sufficient support in terms of hardware or software, for which numerous attempts are being made to improve implementation. For example, a user interface allowing users to easily and conveniently search for and select one or more functions continues to be developed. Thus, the mobile terminals include sophisticated graphic user interfaces (GUIs) that the user can use to access the various functions on the terminal. For example, the user can access a main menu and then select from one of a plurality of submenus such as an e-mail submenu, a calling history submenu, an Internet access submenu, a pictures submenu, or the like. Once the user selects a particular submenu, the mobile terminals may provide yet another list of submenus or options that the user can select to perform a desired function.

In line with the advancement of the information communication sector, common users have begun to produce faster or more meaningful information than in the past, thereby forming a user created contents (UCC) culture. Specifically, a user can combine photo images or video with writings/articles/or other commentary and upload the same to a website, such as a portal site, to allow other users to easily watch or read them via the UCC.

In order to easily produce contents by using the mobile terminal, it is necessary to properly dispose a camera for capturing images or video or a manipulating unit for manipulating the camera.

BRIEF SUMMARY OF THE INVENTION

Accordingly, one object of the present invention is to address the above-noted problem and other problems.

Another object of the present invention is to provide a mobile terminal having a camera that captures an image or video and a manipulation unit that manipulates the camera, wherein the camera and the manipulation unit are disposed to allow a user to easily and quickly use them.

Still another object of the present invention is to provide a mobile terminal with good transmissibility allowing a user to connect quickly to a computer or a website on the Internet to upload captured image or video contents.

To achieve these and other advantages and in accordance with the purpose of the present invention, as embodied and broadly described herein, the present invention provides in one aspect a mobile terminal that includes an upper body having an upper surface, a display located at the upper body, a lower body having first and second upper surfaces, the upper body being connected to the lower body for movement between a closed configuration in which the upper body completely covers the second upper surface and an open configuration in which the upper body partially covers the second upper surface to expose a portion of the second upper surface, the upper surface of the upper body being substantially co-planar to the first upper surface of the second body in the open and closed configuration, a first camera located at one of the upper body and the lower body, and at least one camera-dedicated key located at said portion of the second upper surface exposed in the open configuration, the at least one camera-dedicated key being configured to control the first camera.

In another aspect, the present invention provides a mobile terminal that includes an upper body having an upper surface, a display located at the upper body, a lower body having first and second upper surfaces, the upper body being connected to the lower body to be slidably movable in a widthwise direction of the mobile terminal for movement between a closed configuration in which the upper body completely covers the second upper surface and an open configuration in which the upper body partially covers the second upper surface to expose a portion of the second upper surface, the upper surface of the upper body being substantially co-planar with the first upper surface of the second body in the open and closed configurations, a camera located at one of the upper body and the lower body, and at least one key located at said portion of the second upper surface exposed in the open configuration, the at least key being configured to manipulate the camera.

In still another aspect, the present invention provides a mobile terminal that includes an upper body having an upper surface, a display located at the upper body, a lower body having first and second upper surfaces, the upper body being rotatably connected to the lower body for movement between a closed configuration in which a lower surface of the upper body completely covers the second upper surface and an open configuration in which the lower surface of the upper body partially covers the second upper surface to expose a portion of the second upper surface, the upper surface of the upper body being substantially co-planar to the first upper surface of the second body in the open and closed configurations, a first camera located at one of the upper body and the lower body, and at least one key located at said portion of the second upper surface exposed in the open configuration, the at least key being configured to manipulate the first camera.

In yet another aspect, the present invention provides a mobile terminal that includes an upper body having an upper surface and a lower surface, a display located at the upper body, a lower body having first and second upper surfaces, the lower body being connected to the upper body for movement between a closed configuration in which the upper body completely covers the second upper surface and an open configuration in which the upper body partially covers the second upper surface to expose a portion of the second upper surface, the upper surface of the upper body being substantially co-planar to the first upper surface of the second body in the open and closed configurations, and a camera located at a portion of the lower surface of the upper body, the camera being exposed when the upper body is in the open configuration.

Further scope of applicability of the present invention will become apparent from the detailed description given hereinafter. However, it should be understood that the detailed description and specific examples, while indicating preferred embodiments of the invention, are given by illustration only, because various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the exemplary embodiments of the present invention, examples of which are illustrated in the accompanying drawings.

Figure 1:
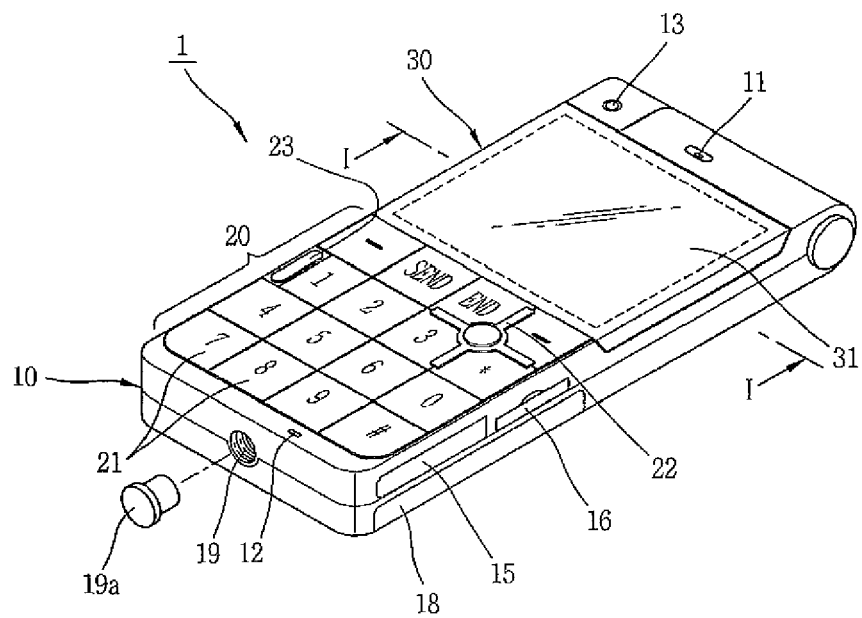
FIG. 1 is an upper perspective view of a mobile terminal according to one exemplary embodiment of the present invention.

FIG. 1 is an upper perspective view of a mobile terminal according to an embodiment of the present invention. As shown in FIG. 1, the mobile terminal includes an upper body 30 and a lower body 10. On an upper surface of a mobile terminal 1, preferably the upper body 30, a keypad 20 for inputting information or control commands and a display 31 for displaying visual information are provided. The display 31 visually displays information in various modes of the mobile terminal 1 and may be implemented by a liquid crystal display (LCD) module an organic light emitting diode (OLED) module, a transparent organic light-emitting device (TOLED) module, an e-paper, or the like. In addition, the display 31 may include a touch input unit, such as a touch screen or touch pad, to allow input via touch.

The mobile terminal 1 may have a unit for wireless mobile communications. For this purpose, the mobile terminal may have a unit for processing a radio signal to convert it into a communication-understandable voice or, reversely, processing a user voice into a radio signal and transmitting the same. For call communication, a first audio output unit 11, such as a receiver, that outputs a voice from a calling party or other sound is disposed on one end of an upper surface of the mobile terminal 1, and a first microphone 12 that amplifies a user's voice is disposed on an opposite end portion of the first audio output unit 11. The first audio output unit 11 may also be implemented in the form of a speaker to output a notification sound of the mobile terminal, a reproduced sound of multimedia, and the like.

In order to allow inputting of numbers, characters, or other symbols in an editing mode, the keypad 20 includes keys 21 indicating numbers, characters, or various symbols. Regardless of whether the keys 21 are illuminated, they may be configured so as to be recognized from outside via the display 31. The keypad 20 may be implemented as a plurality of dome switches, a touch screen or a touchpad for receiving input of a command or information through a user's push or a touch manipulation, or may be implemented in the form of a wheel, jog switch, or a joystick.

Figure 2:
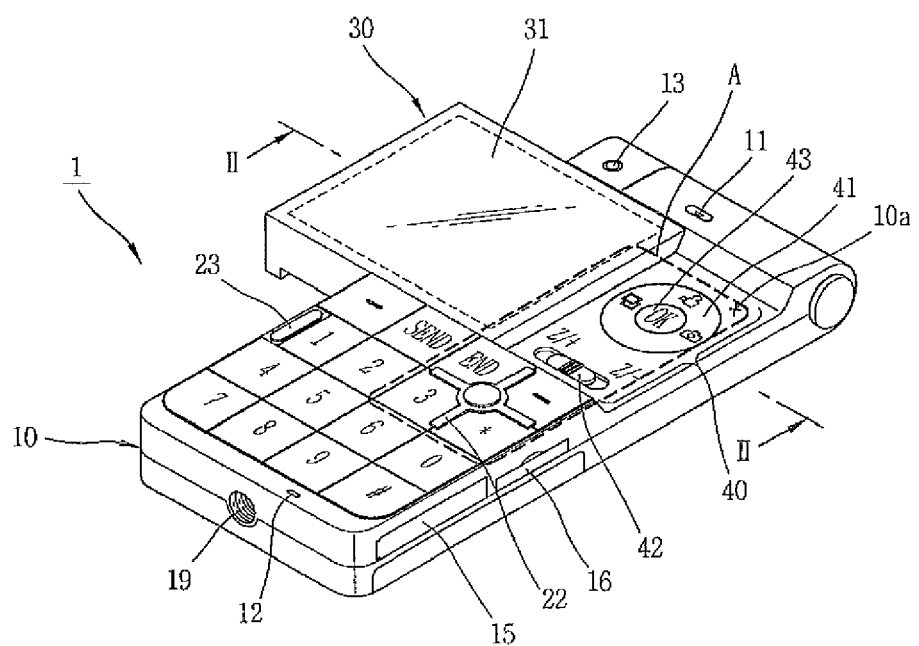
FIG. 2 is an upper perspective view showing an arrangement where an upper body of the mobile terminal of FIG. 1 is in an open configuration with respect to a lower body of the mobile terminal.

FIG. 2 is an upper perspective view showing an arrangement where an upper body 30 is in an open configuration such that the upper body 30 is moved with respect to the lower body 10. As noted above, the mobile terminal 1 includes the upper body 30 and the lower body 10, and the display 31 constitutes a portion of the upper body 30, which slides in a widthwise direction with respect to the lower body 10. The lower body 10 includes first and second upper surfaces and the upper body 30 implements a closed configuration and an open configuration by being slid with respect to the second upper surface. In particular, as shown in FIG. 1, when the upper body 30 completely covers the second upper surface, this is referred to as the closed configuration, and, as shown in FIG. 2, when the upper body 30 partially covers the second upper surface to expose a portion of the second upper surface is referred to as the open configuration.

The upper body 30 is received in a slide recess 10a formed in a widthwise direction on the lower body 10 and is slidable in the widthwise direction. Thus, while the upper body 30 is moveable, the upper body 30 does not cover the keypad 20. In this embodiment, the upper body 30 is slidably moved to be open and closed in the shape of 'T' with respect to the lower body 10. As a result, the mobile terminal 1 of this exemplary embodiment is different from a related art mobile terminal having a keypad that is exposed according to a slidable movement in a lengthwise direction.

The upper surface of the upper body 30 and the upper surface of the lower body 10 may be substantially co-planar, as shown in FIG. 1, thereby avoiding a complicated external appearance. As for the open configuration of the upper body 30, the upper body 30 may be installed such that it is opened when a force is applied in a direction in which the user widens his thumb with the lower body 10 grasped in his hand. Specifically, when the user holds the lower body 10 with his right hand, the upper body 30 is opened when it is moved in the direction in which the user's thumb widens, which is a natural movement for the user.

Figure 3:
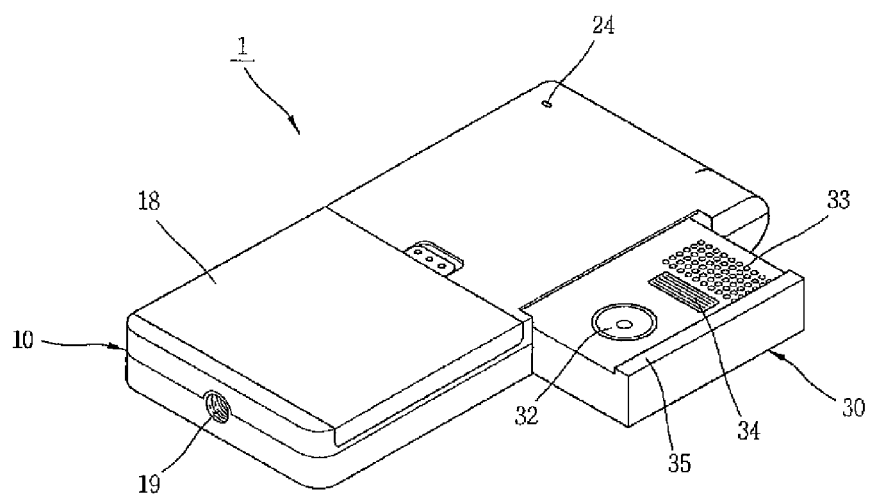
FIG. 3 is a rear perspective view of the mobile terminal of FIG. 2.

As seen in FIG. 3, a second microphone 24 for recording sound may be disposed on a portion of the lower surface of the lower body 10. The second microphone 24 may be disposed at a position that does not cause an interference with a second audio output unit 33, which is provided on a lower surface of the upper body 30, or the like. The second microphone 24 may have a directionality to exclude noise that may be generated when the mobile terminal 1 is used to capture video.

The first camera 32 is disposed on a region of the lower surface of the upper body 30 that is exposed when the upper body 30 is moved from the closed configuration to the open configuration. Thus, because it is exposed from the lower body 10 only when used, the first camera 32 can be protected when not in use. A flash 34 is disposed adjacent to the first camera 32 and emits light toward a subject when an image of the subject is to be captured with the first camera 32. The second audio output unit 33, which may be a speaker having a large output to allow the user to enjoy a multimedia file with a richer sound volume, is also provided on the same lower surface of the upper body 30 as the camera 32. The second audio output unit 33, in conjunction with the first audio output unit 11, may provide a stereoscopic function. The second audio output unit 33 may also be used for call communication in a speaker phone mode.

A protrusion 35 is provided at an end of the lower surface of the upper body 32. The protrusion 35 extends further than an outer surface of the first camera 32. As a result, the protrusion 35 prevents the first camera 32 from being in contact with the outer surface of the lower body 10, thereby protecting the first camera 32 from being to be scratched or marred during movement of the upper body 30.

With reference to FIG. 2, at least one camera-dedicated key 40, which includes at least one button or key for manipulating the first camera 32 is disposed at the region of the second upper surface of the lower body 10 exposed when the upper body 30 is in the open configuration. The camera-dedicated key 40 may be configured as a plurality of keys or a button unit. The camera-dedicated key 40 includes a mode select dial 41 for changing the mode of the first camera 32 and a zoom select switch 42 for implementing zoom-in/zoom-out of the first camera 32. The mode select dial 41 may be formed to include a wheel that is rotatable in place, or symbols or icons for indicating each mode may be displayed around the wheel. A shutter key 43 is also provided at a central portion of the mode select dial 41 to instruct capturing of a selected image in an image or video capture mode. The zoom select switch 42 is installed to be movable in two different directions from the center.

While the camera-dedicated key 40 is shown with a particular arrangement, it is understood that the mode select dial 41 and the zoom select switch 42 may be disposed at a position different from that shown in FIG. 2 within the installation region of the camera-dedicated key 40. A lighting device may also be provided to illuminate the mode select dial 41 and the zoom select switch 42. The mode select dial 41 and the zoom select switch 42 are examples of means for manipulating the first camera 32, and additional buttons or keys for controlling the function of the first camera 32 may be also be provided.

The keypad 20 is located at the first upper surface of the lower body 10 and includes a navigation key 22 that can control detailed functions of the first camera 32. In particular, as shown in FIG. 2, the navigation key 22 may be disposed at a lower region adjacent to the camera-dedicated key 40. The navigation key 22 may be used to precisely control a detailed function, for example, the brightness of an image displayed on the display 31, a shutter speed, or the like. The camera-dedicated key 40 and the navigation key 22 are concentrated in the region indicated by 'A'. Because they are disposed at the region that is exposed as the upper body 30 is moved to the open configuration, and at peripheral region to the exposed region, the user can easily manipulate them with his finger as described below with reference to FIGS. 5A and 5B.

The keypad 20 includes a connection key 23 for instructing the mobile terminal 1 to make a connection to website to wirelessly upload a photo or video image captured by the first camera 32. Specifically, when the connection key 23 is pressed, a portal site, a blog site, a UCC site, or the like, to or from which an image or video can be uploaded or downloaded, can be directly connected to quickly upload or download generated contents within a short time. The connection key 23 facilitates recording or storing images via the mobile terminal 1. While the connection key 23 is located as part of the keypad 20, as shown in FIGS. 1 and 2, the connection key 23 may be disposed at the side of the upper body 30 or the lower body 10.

A recess 19 may be formed at a lower end of the lower body 10, allowing the lower body 10 to be mounted on a mounting device such as a tripod. A female thread for receive a thread of a standardized tripod may be formed on the recess 19, and, alternatively, a female thread fitting an adapter to be connected with a tripod may be provided. The recess 19 may be covered by a stopper 19a.

An external interface 15 may be provided at the side of the lower body 10. The interface 25 may be configured to allow a video obtained by the first camera 32 to be shared with a computer or other server device. The external interface 15 may be also be implemented as one of a connection port for connecting an earphone to the mobile terminal via a fixed or wireless means, a port for short-range communications (e.g., an Infrared Data Association (IrDA) port, a BLUETOOTH port, a wireless LAN port, or the like), power supply port for providing power to the mobile terminal 1, or the like.

In order to enhance storage characteristics of multimedia contents and to easily transfer stored contents to a different device, an external memory 16 may be provided at the side of the mobile terminal 1. A power supply unit 18 may be provided on the lower surface of the lower body 10. The power supply unit 18 may be detachably installed on the lower body 10, and may be implemented in the form of a rechargeable battery, which may be detachably connected to the mobile terminal 1.

As seen in FIG. 1, a second camera 13 may be installed on an upper surface of the lower body 10. The second camera 13 may be suitable for capturing a subject in front of the mobile terminal 1, specifically, the user himself, and may be also used for the purpose of video call communication. The second camera 13 has an image capture direction which is substantially the opposite to that of the first camera 32 and may have a different number of pixels (different resolution) from that of the first image input unit. For example, the second camera 13 may operate with a relatively lower resolution to capture the user's face and transmit the same to another party during video call communication or the like, while the first camera 32 may operate with a relatively higher resolution to capture general subjects.

Figure 4A:
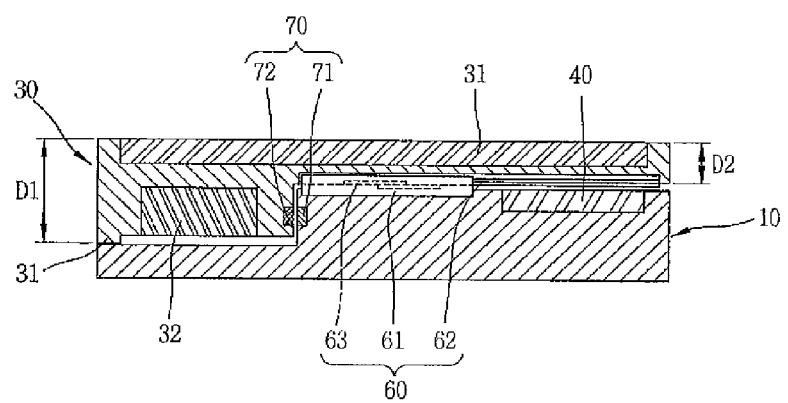
FIG. 4A is a sectional view taken along line I-I in FIG. 1, and FIGS. 4B and 4C show a process of moving the upper body taken along line II-II in FIG. 2.
Figure 4B:
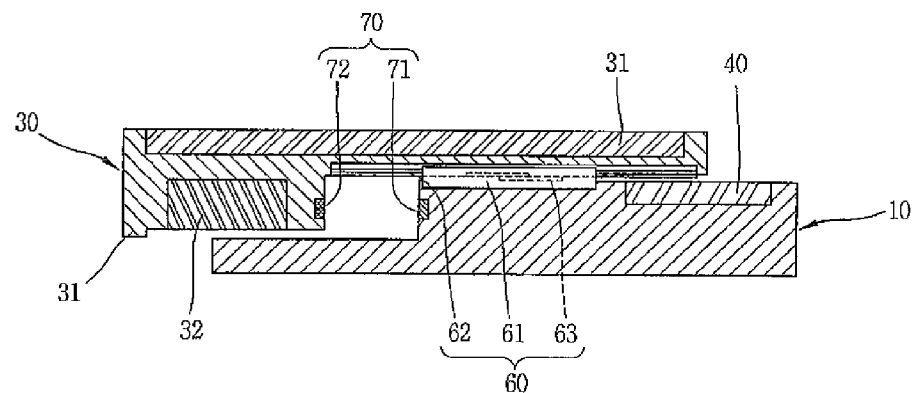
Figure 4C:
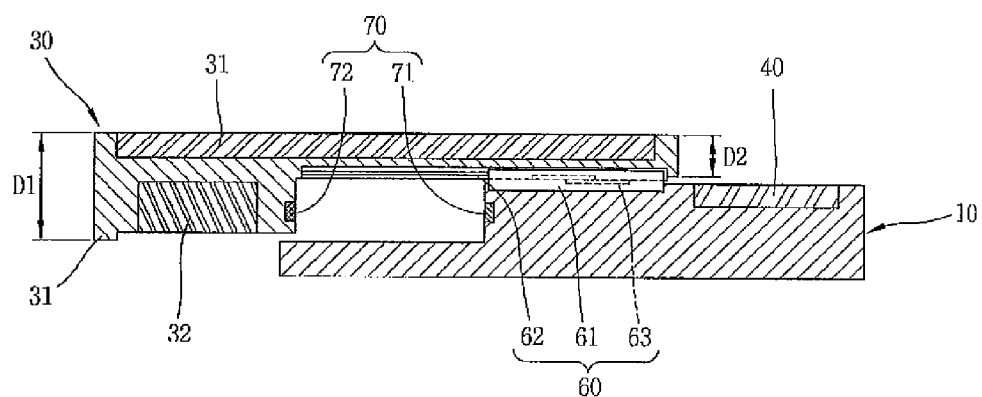

FIGS. 4A to 4C show sectional views of the mobile terminal 1 as the upper body is moved from the closed position to the open position. An elastic module 60 for assisting in moving the upper body 30 between the closed configuration and the open configuration is installed between the lower body 10 and the upper body 30. As shown in FIG. 4A, the elastic module 60 includes a first slide member 62 connected to the lower body 10, and a second slide member 61 connected to the upper body 30. The second slide member 61 is slidably connected to the first slide member 62. The first and second slide members 62 and 61 may be formed to have a flat plate form or a rod form.

A spring 63 is provided between the first and second slide members 62 and 61 for providing an elastic force during movement of the first slide member 62 with respect to the second slide member 61. The spring 63 is located such that its elastic restoration energy is retained (stored) while the upper body 30 is moved from one of the closed and open configurations toward an intermediate position. After passing the intermediate position, the retained energy is released, thereby assisting in moving the upper body from the intermediate position to the other of the closed and open configurations. With such configuration, the elastic module 60 provides a smooth, so-called, semi-automatic opening/closing structure, and assists in moving the upper body 30 with respect to the lower body 10.

A sensing unit 70 is installed between the lower body 10 and the upper body 30 to sense opening and closing of the upper body to change to an operation mode of the first camera 32 when the upper body 30 is moved. As shown in FIG. 4A, the sensing unit 70 includes a magnet 72 disposed at the upper body 30 and a magnetic switch 71 installed at the lower body 10. The magnetic switch is configured to detect the movement of the magnet 72 with respect to the magnetic switch 71 and to control the operation mode of the mobile terminal 1 accordingly. For example, when the upper body 30 is in the closed configuration, the magnet 30 is disposed adjacent the magnetic switch 71, and the magnetic switch sends a signal to a controller (not shown) to disable the operation of the first camera 32. When the upper body 30 is moved to the open configuration, as shown in FIG. 4B, the magnet 72 is spaced from the magnetic switch 71, and the magnetic switch 71 sends a signal to the controller to enable operation of the first camera 32.

With reference to FIG. 4A, the upper body 30 has a first thickness D1 at a region where the first camera 32 is disposed, and has a second thickness D2 that is smaller than the first thickness D1 at a region opposite to where the camera-dedicated key 40 is located. Specifically, the first thickness D1 of the upper body 30 includes the thickness of the display 31 and that of the first camera 32. By providing a mobile terminal 1 where the second thickness D2 is smaller than the first thickness D1 allows the user to operate the first camera 32 without excessively bending his finger while manipulating the camera-dedicated key 40, thereby improving the usability of the camera-dedicated key.

Figure 5A:
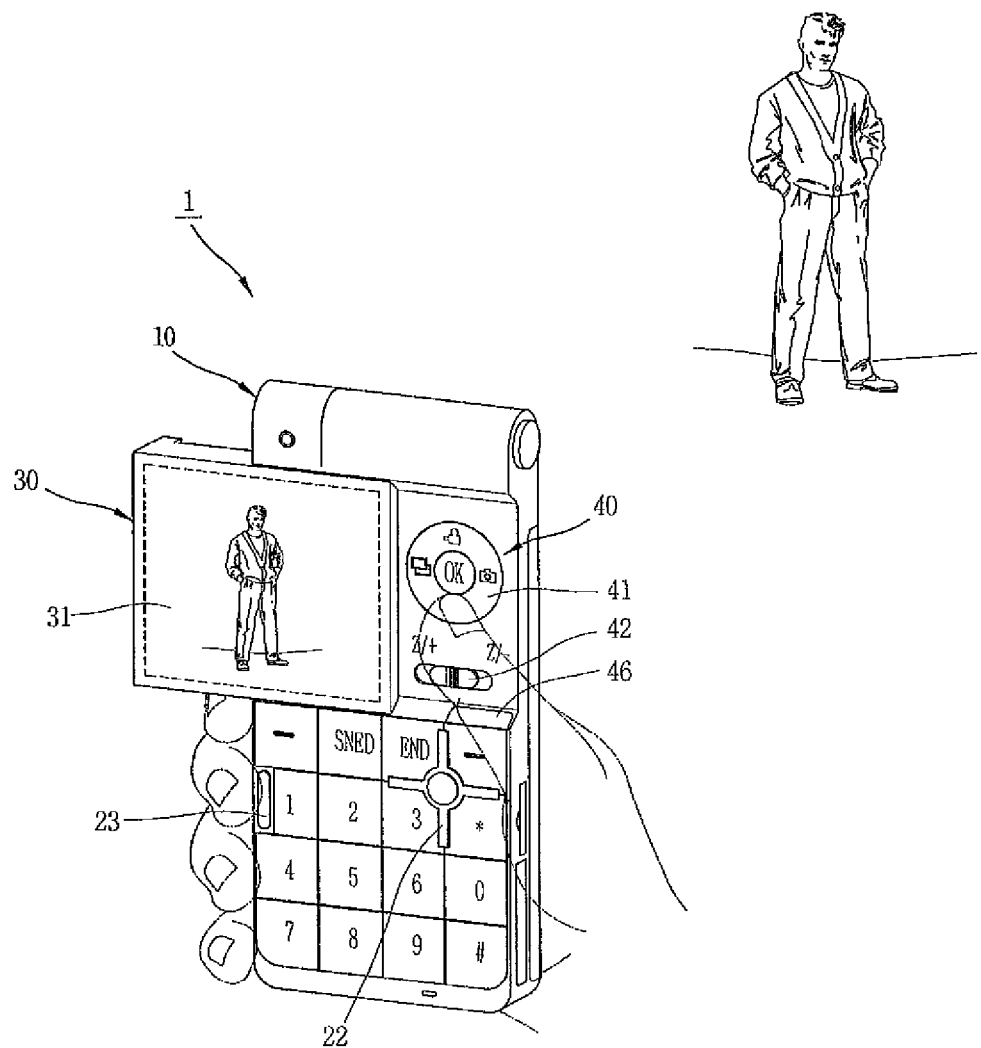
FIGS. 5A and 5B show different operational states of the mobile terminal of FIG. 1 performing image capturing.
Figure 5B:
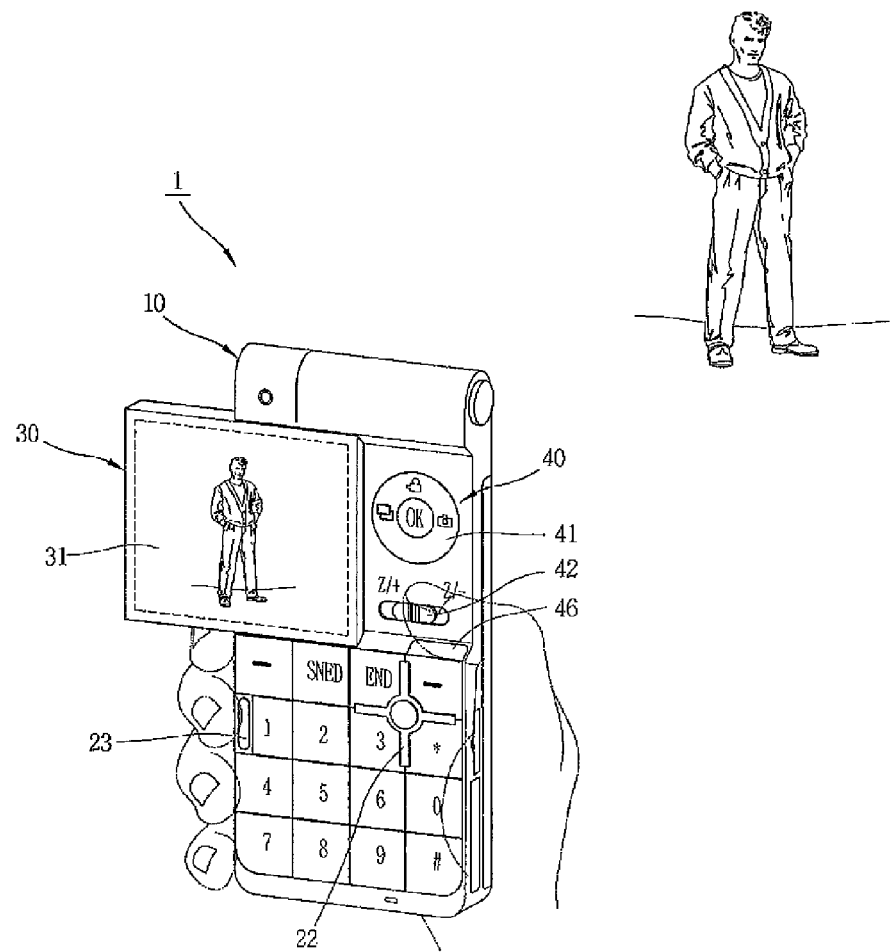

FIGS. 5A and 5B show different operational states of the mobile terminal 1 performing image capturing. As shown in FIG. 5A, the upper body 30 is slid open in the widthwise direction to expose the camera-dedicated key 40 for manipulating the first camera 32. In this arrangement, the user can manipulate the camera 32 while his hand grasps the lower body 10. Accordingly, the user can more easily capture an image or video. For a simpler operation of the camera 32, the user can immediately enable the camera 32 by simply pushing the upper body 30 to the open configuration.

As shown in FIGS. 5A and 5B, a shutter button 46 may be formed at the side wall of the slide recess 10a. While the user is holding the lower body 10 with his hand, he may apply a force in the direction of bending his thumb towards the shutter button 46, whereby wobbling of the mobile terminal 1 can be minimized while manipulating the shutter button 46. As a result, a higher quality photo image can be obtained.

Figure 6A:
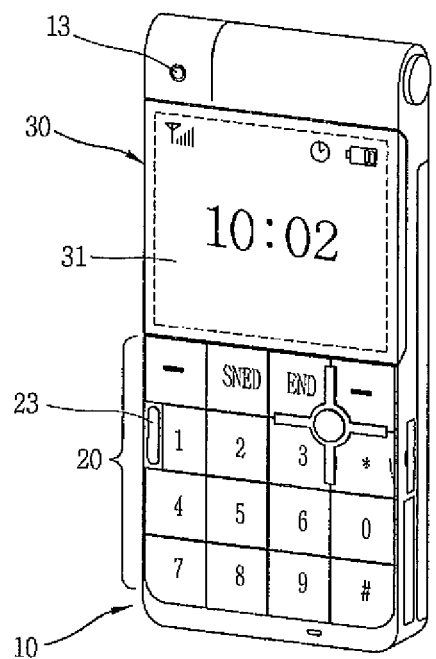
FIGS. 6A and 6B show operational states of the mobile terminal in an closed configuration and an open configuration, respectively, according to an exemplary embodiment of the present invention.
Figure 6B:
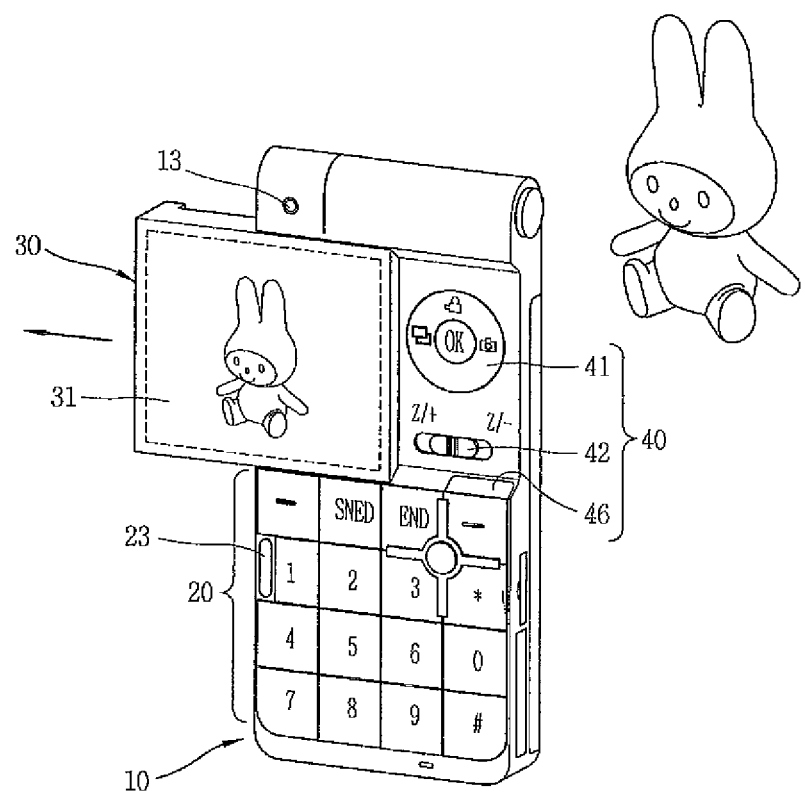

FIGS. 6A and 6B show operational states of the mobile terminal 1 in a closed configuration and an open configuration, respectively. In the closed configuration the mobile terminal can be used in a standby mode, as shown in FIG. 6A, a phone call mode, an editing mode, or the like. When the upper body 30 is slid into the open configuration, the camera 32 may immediately enter an operation mode for capturing video. Accordingly, the display 31 outputs an image of a subject or a user interface for a detailed function of the camera. Then, the user can create video, UCC, or the like through the camera-dedicated key 40 that is exposed. When the upper body 30 is moved into the closed configuration, content captured while the mobile terminal 1 was in the open configuration may be automatically stored and the camera mode can be terminated according to previous settings.

Figure 7:
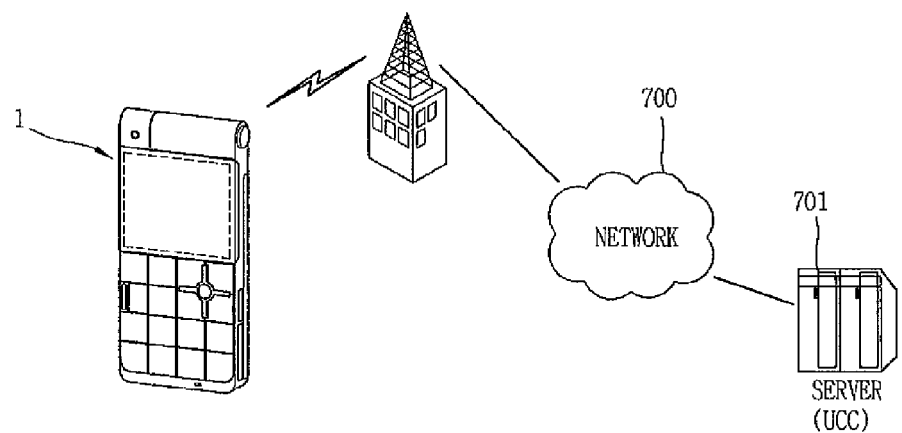
FIG. 7 is a conceptual view showing a network connection via the mobile terminal according to an exemplary embodiment of the present invention.

FIG. 7 is a conceptual view showing a network connection for the mobile terminal 1 according to an exemplary embodiment of the present invention. The mobile terminal 1 can be wirelessly connected to a network 700 via its wireless communication function. The network 700 includes the Internet or the like, and the user may access a web site to upload the UCC to a server 701.

Figure 8:
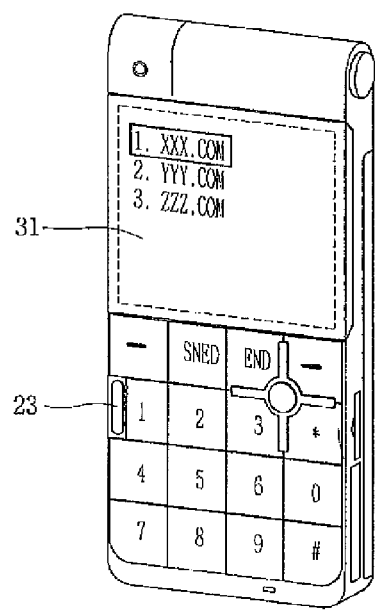
FIG. 8 shows an operational state of an output on a display when a connection key of the mobile terminal of FIG. 1 is pressed.

FIG. 8 shows an operational state of an output on a display when the connection key of the mobile terminal is pressed. In order to upload the UCC more quickly, the user may directly access a UCC site. To accomplish the connection to the UCC site, the connection key 23 provided on the keypad 20 is pressed. The mobile terminal then directly connects to a previously stored site, or as shown in FIG. 8, one of the sites outputted on the display unit 31 may be selected for connecting the mobile terminal 1 to the appropriate site. Once connected, the mobile terminal 1 can upload/download the data accordingly.

Figure 9:
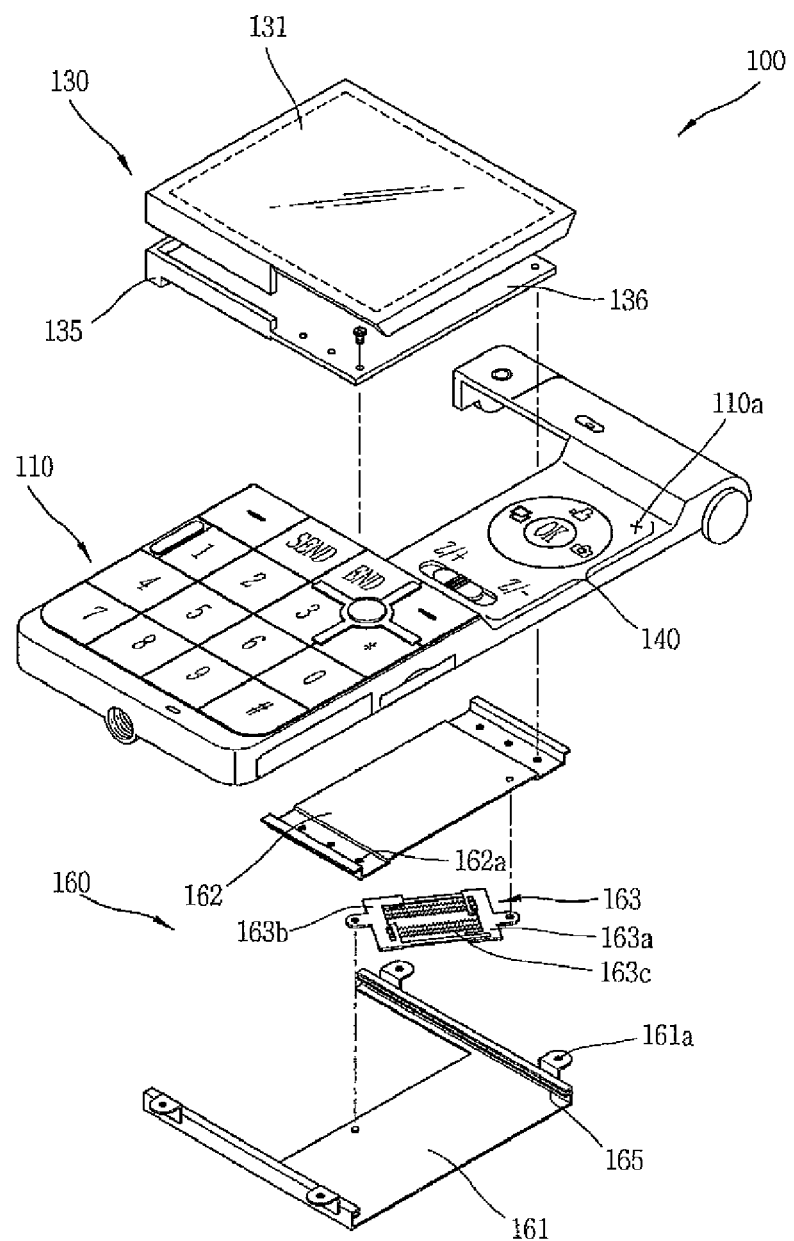
FIG. 9 is an exploded perspective view of a mobile terminal according to another exemplary embodiment of the present invention.
Figure 10A:
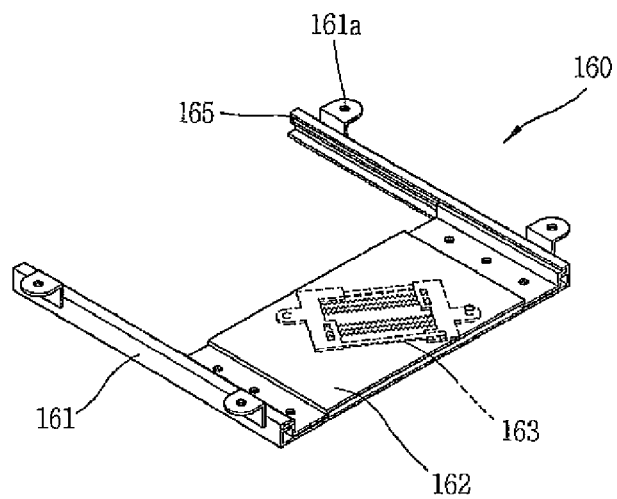
FIGS. 10A and 10B are perspective views showing operational states of an elastic module of the mobile terminal of FIG. 9.
Figure 10B:
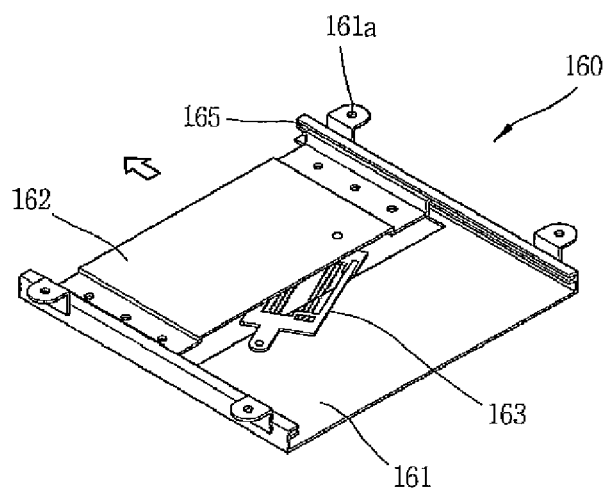
Figure 11A:
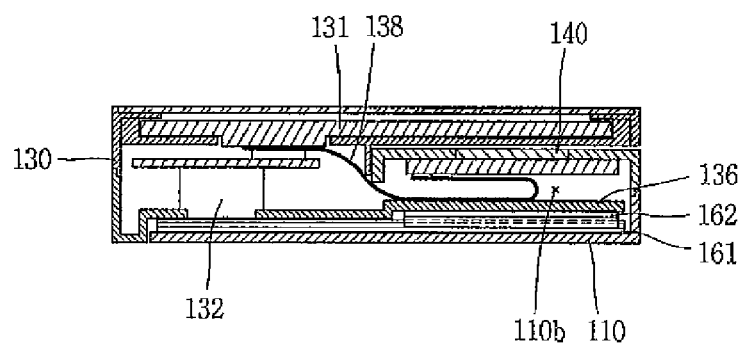
FIGS. 11A and 11B are sectional views showing operation states of the mobile terminal of FIG. 9.
Figure 11B:
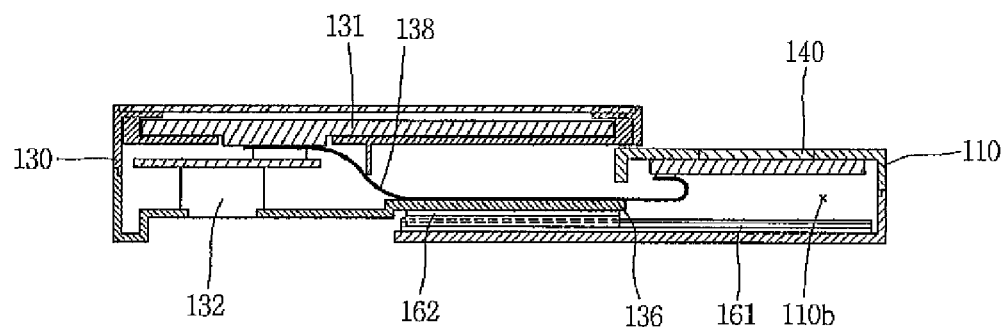

FIG. 9 is an exploded perspective view of the mobile terminal according to another exemplary embodiment of the present invention, FIGS. 10A and 10B are perspective views showing operational states of an elastic module of the mobile terminal of FIG. 9, and FIGS. 11A and 11B are sectional views showing operation states of the mobile terminal of FIG. 9. With reference to FIG. 9, a mobile terminal 100 includes a lower body 110 with a slide recess 110a formed thereon, an upper body 130, and an elastic module 160 for slidably moving the upper body 130 in an elastic manner with respect to the lower body 110.

A passage hole 110b, as best seen in FIGS. 11A and 11B, is formed in a widthwise direction of the lower body 110 and is located at an inner side of a camera-dedicated key 140. The upper body 130 also includes a slide support unit 136 which is slidably moveable along the passage hole 10b and supports the upper body 130. For example, the upper body 130 may have a channel shape, when viewed from the side, with the camera-dedicated key 140 disposed in the space therebetween when the upper body 130 is in the closed configuration.

The elastic module 160 is located between the slide support unit 136 and the lower body 110. The elastic module 160 includes a first slide member 161, a second slide member 162, and a spring unit 163. The first slide member 161 is connected to the lower body 110, and the second slide member 162 is connected to a lower surface of the slide support unit 136. The first slide member 161 and the second slide member 162 may be made of metal plate so as to be prevented from being deformed or abraded due to repeated movement of the upper body 130. Slide rails 165 are provided at both ends of the first slide member 161 in a widthwise direction of the lower body 110. Accordingly, both ends of the second slide member 162 are inserted into the slide rails 165 so as to be slidably moved therealong. The slide rails 165 may include a lubricant member made of a resin material to provide a smooth movement and reduce frictional contact. The spring unit 163 is located between the first and second slide members 161 and 162 such that its elastic restoration energy is retained (stored) while the upper body 130 is moved from one of the closed and open configurations toward an intermediate position. After passing the intermediate position, the retained energy is released, thereby assisting in moving the upper body 130 from the intermediate position to the other of the closed and open configurations.

The spring unit 163 includes a first spring support portion 163a, a second spring support portion 163b, and a spring 163c. The first and second spring support portions 163a and 163b are pivotally attached to the first and second slide members 161 and 162, and the first and second spring support portions 163a and 163b may be configured such that they move towards and away from each other along a straight line. Each end of the spring 163c is supported by one of the first and second spring support portions 163a and 163b, respectively. A plurality of springs 163c may be provided to reduce inclination of a force and enhance reliability.

When the first slide member 161 slides towards the intermediate position with respect to the second slide member 162, the spring 163c widens to store elastic energy. When the spring 163c widens to its maximum level, it reaches a dead point at the intermediate position, and from this position, the first slide member 161 continues to slide away from the intermediate position in the ongoing direction, even without the application of external force.

As shown in FIGS. 11A and 11B, the slide support unit 136 slides in the passage hole 110b in the lower body 110 as the upper body 130 moves between the closed position and the open position. A flexible printed circuit board (FPCB) 138 providing communication between the upper body 130 and the lower body 110 passes through the passage hole 110b.

A sensing unit (not shown) may be provided between the lower body 110 and the upper body 130 in order to sense whether or not the upper body is in a closed or open configuration in order to change the mobile terminal to a camera operation mode when the upper body 130 is in the open configuration. The sensing unit may include a magnet disposed at the upper body 130 and a magnetic switch installed at the lower body 110 as described above.

Figure 12:
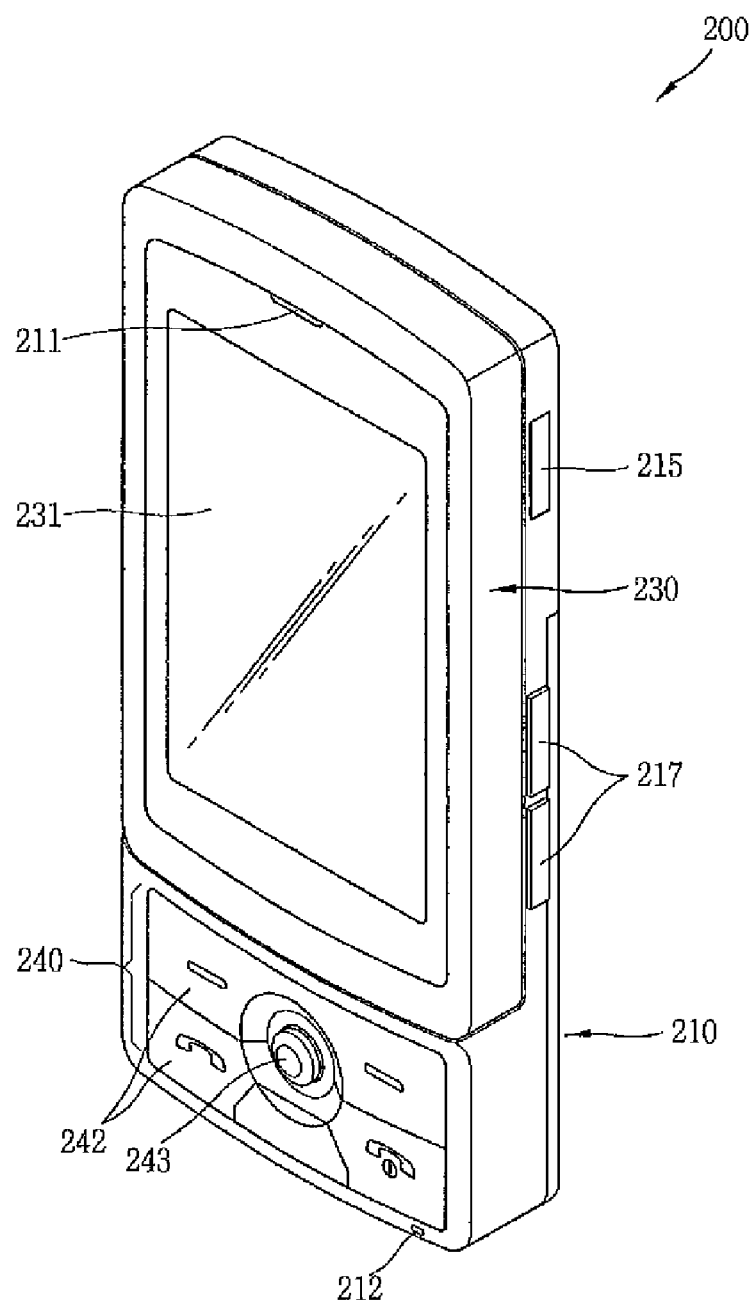
FIG. 12 is a perspective view of a mobile terminal according to another exemplary embodiment of the present invention.

FIG. 12 is a perspective view of a mobile terminal according to another exemplary embodiment of the present invention. As shown in FIG. 12, a mobile terminal 200 includes a lower body 210 with a first keypad 240 disposed on its upper surface, and an upper body 230 with a display 231 disposed on its upper surface, the upper body 230 being swingably connected to the lower body 210. In a closed configuration, the upper body 230 is shorter than the lower body 210 so that a portion of an upper surface of the lower body 210 is exposed, and the first keypad 240 is always exposed regardless of the orientation of the upper body 230.

The mobile terminal 200 may include a unit for wireless mobile communication. For this purpose, the mobile terminal 200 may have a unit for processing a radio signal to convert it into a communication-understandable voice or, reversely, processing a user voice into a radio signal and transmitting the same. For call communication, a first audio output unit 211, such as a receiver, that outputs a voice from a calling party or other sound is disposed on one end of an upper surface of the upper body 230, and a microphone 212 is provided at a lower end of the lower body 210 in order to record a user's voice or other sound. The first audio output unit 211 may also be implemented in the form of a speaker to output a notification sound of the mobile terminal, a reproduced sound of multimedia, and the like. The first audio output unit may be implemented as a pair of speakers to provide a stereoscopic function. While the microphone 212 has been shown as being on the lower body 210, the microphone 212 may be disposed on an upper surface or the side of the lower body 210, or may be disposed between keys of the first keypad 240.

The keys 242 of the first keypad 240 may be used to input information, to perform a function that can be view on the display 231 in the closed configuration, or to control navigation within a set of menus and submenus. The keys 242 may include at least one jog key or wheel, such as jog key 243.

The display 231 installed on the upper body 230 may include a LCD module, an OLED module, a TOLED module, or the like, for visually displaying information. In addition, the display 231 may include a touch input unit, such as a touch screen or touch pad, to allow input via touch.

An interface 215 and a side key 217 may be installed on the side of the lower body 210. The side key 217 may be used to immediately execute or control a particular function, or may be set to perform a function associated with manipulation of the first camera 232 or the second camera 213. The interface 215 may be configured to allow a video obtained by the first camera 232 to be shared with a computer or other server device. The external interface 215 may be also be implemented as one of a connection port for connecting an earphone to the mobile terminal via a fixed or wireless means, a port for short-range communications (e.g., an Infrared Data Association (IrDA) port, a BLUETOOTH port, a wireless LAN port, or the like), power supply port for providing power to the mobile terminal 200, or the like.

Figure 13:
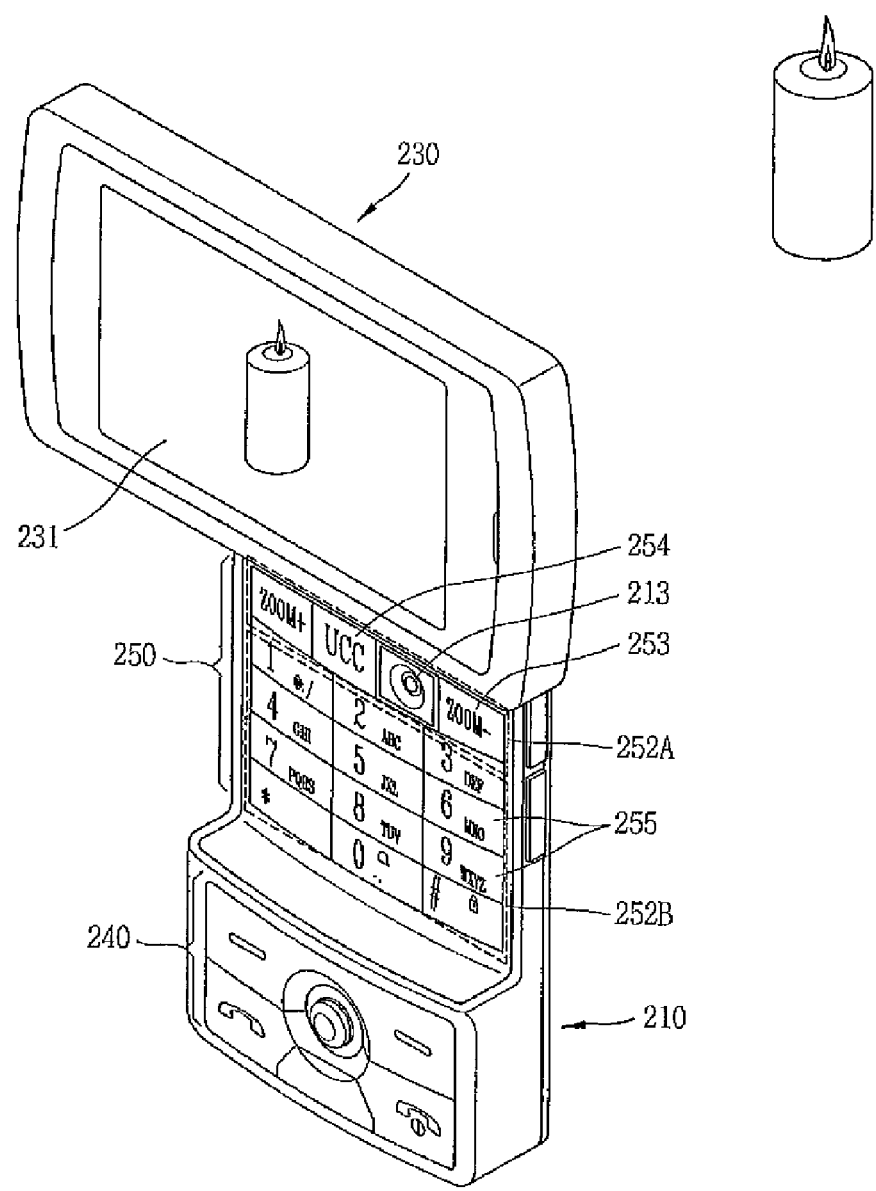
FIG. 13 is a perspective view showing the mobile terminal of FIG. 12 in an open configuration.

FIG. 13 is a perspective view showing the mobile terminal of FIG. 12 in an open configuration by swinging the upper body 230 with respect to the lower body 210. The upper body 230 is rotated by 90° with respect to the lower body 210. Because the display 231 is rotated with the upper body 230, content outputted on the display 231 may be adjusted according to the orientation of the display 231. When in the open configuration, the upper body 230 is rotated with respect to the lower body 210 to expose a camera-dedicated key 253. The open configuration may be implemented by the mobile terminal 200 when the upper body 230 is open at an angle smaller than 90°, and also can be open at an angle larger than 90°, such as 180°. In this case, a rotation limitation element may be provided between the lower body 210 and the upper body 230 in order to prevent over rotation of the upper body 230 beyond an arbitrary angle.

Figure 14:
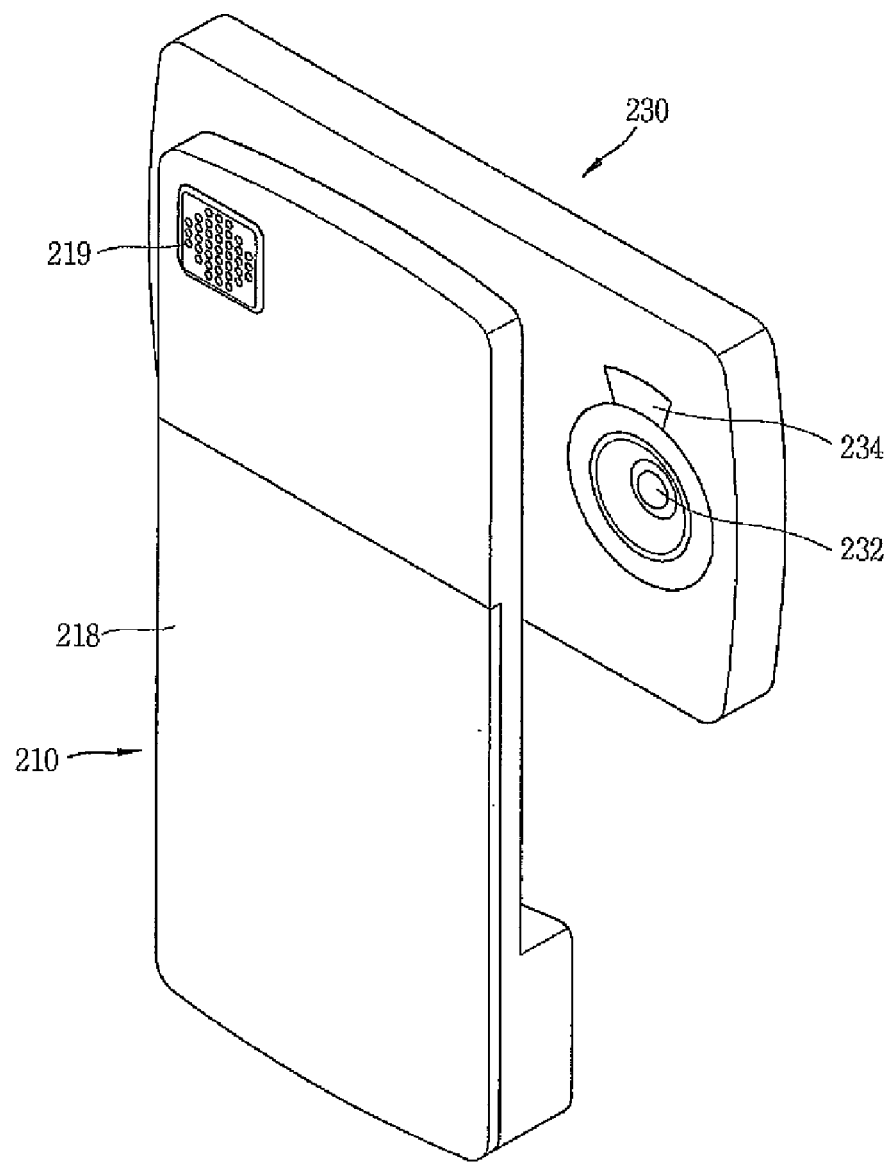
FIG. 14 is a rear perspective view of the mobile terminal of FIG. 13.

FIG. 14 is a rear perspective view of the mobile terminal of FIG. 13. As shown in FIG. 14, a first camera 232 is provided on a lower surface of the upper body 230 to capture an image of a subject. The first camera 232 may capture an image of the subject located at a rear side of the mobile terminal 200, specifically, in front of the user, and an image sensor constituting the first camera 232 may be formed to have a high resolution. A flash 243 is disposed to be adjacent to the first camera 232. The flash 243 emits light toward a subject when an image of the subject is to be captured with the first camera 232.

A power supply unit 218 and a second audio output unit 219 may be provided on the lower surface of the lower body 210. The power supply unit 18 may be detachably installed on the lower body 10, and may be implemented in the form of a rechargeable battery, which may be detachably connected to the mobile terminal 200. As the second audio output unit 219, a speaker having a large output may be used to allow the user to enjoy a multimedia file with a richer sound volume, and may implement a stereoscopic function in conjunction with the first audio output unit 211. In addition, the second audio output unit 219 may be used for call communication in a speaker phone mode.

The first camera 232 is disposed at a position that can be exposed when the upper body 230 is rotated toward the open configuration. As a result, when the upper body 230 is in the closed configuration, as shown in FIG. 12, the first camera 232 is covered by the lower body 210. Accordingly, when the first camera 232 is not in use, the first camera 232 can be effectively protected. In addition, when the upper body 230 is in the closed configuration, a simple external appearance is provided.

As shown in FIG. 13, a second keypad 250 is provided at a region of the lower body 210 that is exposed depending on the rotation of the upper body 230. In particular, the second keypad 250 includes a first region 252A and a second region 252B located beneath the first region 252A. Keys 253, 254 and 255 may be allocated to perform different inputs. In particular, a camera-dedicated key 253 is provided in the first region 252A at the upper end in order to manipulate the first camera 232. The camera-dedicated key 253 may include a shutter key, a zoom-in/zoom-output key, and a camera mode switch key.

In addition, the camera-dedicated key 253 may include a connection key for instructing the mobile terminal 200 to make a connection to website to wirelessly upload a photo or video image captured by the first camera 232. Specifically, when the connection key 254 is pressed, the mobile terminal 200 can be directly connected to a portal site, a blog site, a UCC site, or the like, to or from which the user can upload or download a photo image or video, to upload or download UCC within a short time. Accordingly, multimedia such as a photo image or video captured by the first camera 232 can be more quickly transferred to a particular person (another party) or made available to the public.

A second camera 213 may be provided between the plurality of keys constituting the camera-dedicated key 253. The second camera 213 may be suitable for capturing a subject in front of the mobile terminal 200, specifically, the user himself, and may be also used for the purpose of capturing an image of the user during video call communication. General keys 255 are disposed in the second region 252B of the second keypad 250 to input numbers, characters, or symbols in an editing mode. The second keypad 250 may be implemented using dome switches, a touch screen or a touchpad for receiving input of a command or information through a user's push or touch manipulation, or may be implemented in the form of a wheel, a jog switch, or a joystick.

Figure 15:
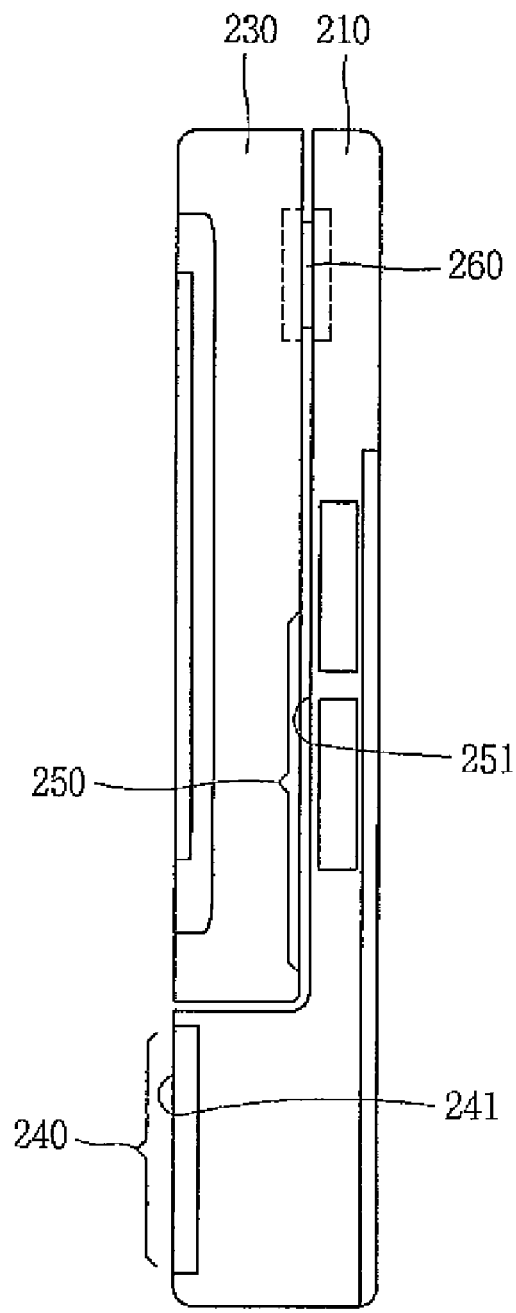
FIG. 15 is a schematic side view of the mobile terminal of FIG. 12.

FIG. 15 is a side view of the mobile terminal of FIG. 12. As shown in FIG. 15, the second keypad 250 is mounted on a second upper surface 251, which is formed to be lower by a certain depth with respect to a first upper surface 241, on which the first keypad 240 is mounted. The upper surface of the upper body 230 and the first upper surface 241 of the first keypad 240 are formed to have substantially the same height (substantially co-planar), thereby avoiding a complicated contour or shape. An elastic module 260 is installed between the lower body 210 and the upper body 230 in order to assist in moving the upper body 230 with respect to the lower body 210. The elastic module 260 may be formed to provide a similar function as the elastic modules described above.

Figure 16:
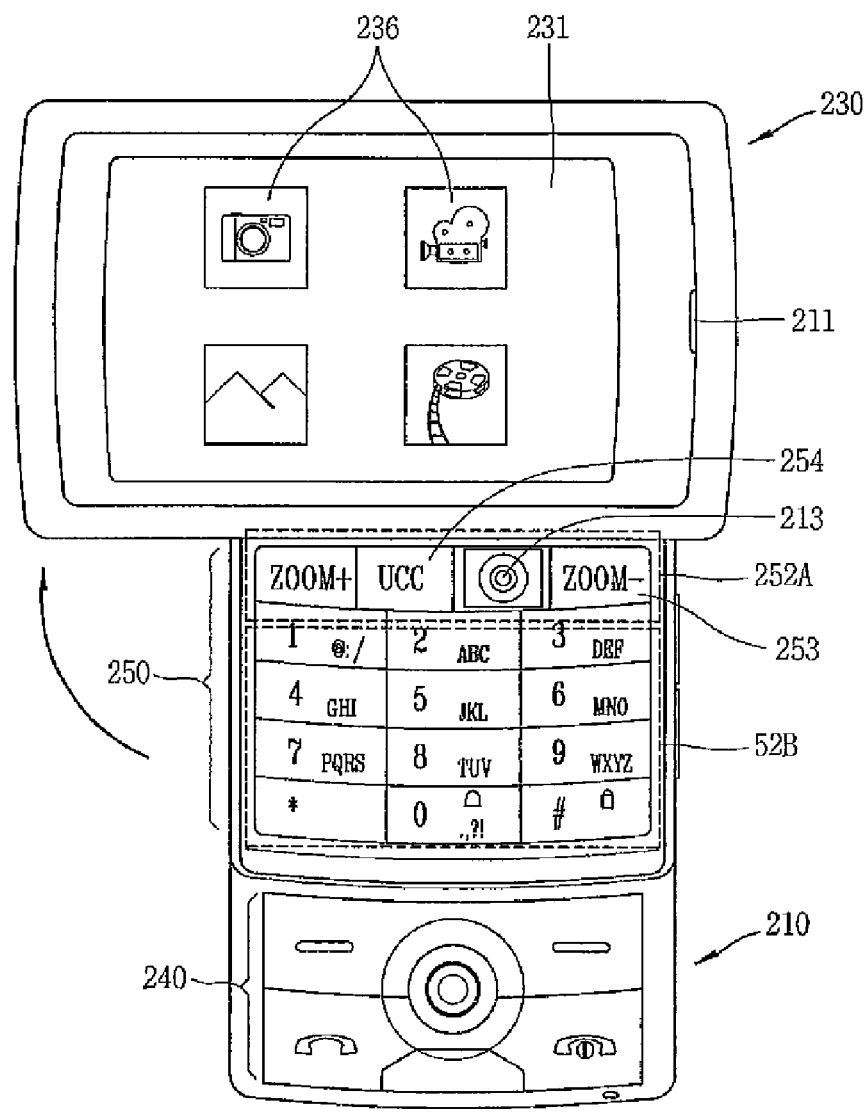
FIG. 16 shows an operational state of a user interface when the mobile terminal of FIG. 12 is in the open configuration.

FIG. 16 shows an operational state of a user interface when the mobile terminal 200 is in an open configuration. In particular, the user interface may display one or more functions that can be selected by the user to control operation of the mobile terminal 200 by selecting one of the displayed icons 236. For example, the icons 236 may represent specific modes of using the camera 232, such as modes for taking still images or video.

Figure 17:
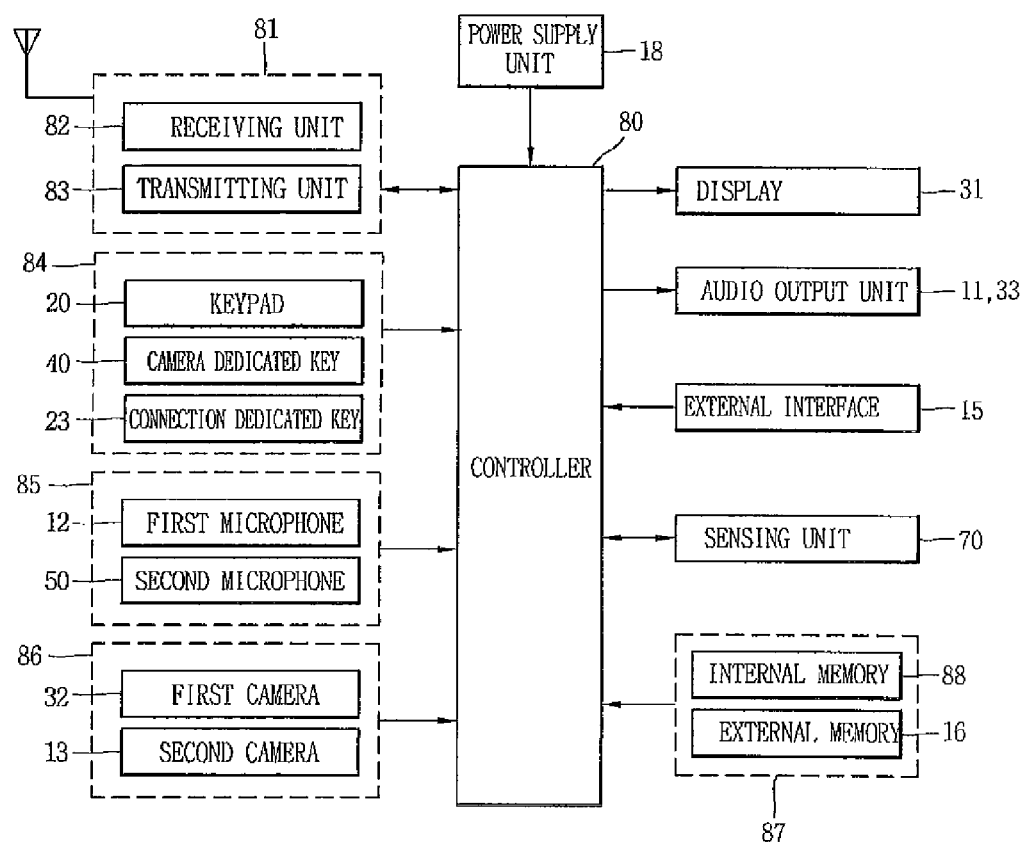
FIG. 17 is a block diagram of the mobile terminal according to an embodiment of the present invention.

FIG. 17 is a block diagram of the mobile terminal of FIG. 1. It should be understood that the following configuration may be applicable to the other exemplary embodiments. As shown in FIG. 17, the mobile terminal 100 includes a wireless communication module 81, a manipulation unit 84, a voice input unit, an image input unit 86, a display 31, audio output units 11 and 33, a sensing unit 70, an external interface 15, a memory 87, a power supply unit 18, and a controller 80.

The controller 80 typically controls the general operations of the mobile terminal. For example, the controller 80 performs controlling and processing associated with voice calls, data communications, video calls, and the like. In addition, the controller 80 can perform control operations of the first and second cameras 32 and 13 in addition to the general control functions.

The wireless communication module 81 transmits/receives radio signals to/from at least one of a base station via an antenna. For example, the wireless communication module 81 is configured to handle transmission/reception of voice data, character data, image data, and control data under the control of the controller 80. The wireless communication module 81 includes a transmitting unit 83 configured to modulate and transmit a signal, and a receiving unit 82 configured to demodulate a received signal.

The manipulation unit 84 includes a keypad 20, a camera-dedicated key 40, and a connection key 23, as shown in FIG. 2, and is configured to provide key input data inputted by the user to the controller 80 to control operations of the mobile terminal.

The audio input unit 85 includes a first microphone 12 that can be used in a phone call mode and a second microphone 50 that can be used in a record mode or in a voice recognition mode. The audio input unit 85 receives an external audio signal and processes it as electric audio data. The processed audio (voice) data may be converted for output into a format transmittable to a mobile communication base station via the wireless communication module 81 during a call mode. During a record mode, the processed audio data is outputted to be stored in the memory 86. The audio input unit 85 may include various types of noise canceling (or suppression) algorithms to cancel (or suppress) noise generated in the course of receiving external audio signals.

The image input unit 86 includes the first and second cameras 32 and 13 and is configured processes image frames such as a still image, video, or the like, obtained by an image sensor in a video call mode or an image capturing mode. The processed image frames are converted into image data that can be displayed on the display 31 and then outputted to the display 31. The image frames processed in the image input unit 86 are stored in the memory 87 or transmitted via the wireless communication module 81 under the control of the controller 80.

The display 31 outputs information processed in the mobile terminal. For example, when the mobile terminal is in the phone call mode, the display 31 may display a User Interface (UI) or a GUI associated with a call or other communication under the control of the controller 80. When the mobile terminal is in the video call mode or the image capturing mode, the display 31 may display a captured and/or received image, a UI, a GUI, and the like, under the control of the controller 80. When the display 31 is configured to have a touch screen, it may be used as an input unit as well as the output unit.

During a call signal reception mode, a phone call mode, a record mode, a voice recognition mode, a broadcast reception mode, and the like, the audio output units 11 and 33 outputs audio data received from the wireless communication module S1 or stored in the memory 87, under the control of the controller 80. Also, the audio output units 11 and 33 provide audible outputs related to a particular function (e.g., a call signal reception sound, a message reception sound, and the like) performed by the mobile terminal. The audio output units 11 and 33 may include a speaker, a receiver, a buzzer, or the like.

The sensing unit 70 senses an opened/closed state of the upper body 30 and applies a signal for controlling an operation of the mobile terminal based on whether the mobile terminal is in a closed configuration or an open configuration. In particular, the sensing unit senses whether or not the mobile terminal is opened or closed and outputs sensing results to the controller 80 to allow controlling of the operation of the terminal. In addition, the sensing unit 70 handles a sensing function associated with whether power is supplied by the power supply unit 18, whether the interface 15 is combined with an external device, or the like.

The interface 15 serves as an interface with at least one external device connected with the mobile terminal. For example, the external devices may include wired/wireless headsets, external power chargers, wired/wireless data ports, card sockets (e.g., for receiving a Subscriber Identity Module/User Identity Module (SIM/UIM) card, or the like). The interface 15 may be used to receive inputs (e.g., data, information, power, or the like) from an external device and transfer the received inputs to one or more elements within the mobile terminal, or may be used to transfer data from the mobile terminal to an external device.

The power supply unit 18 receives external or internal power and supplies power required for the operations of the respective elements under the control of the controller 80.

The memory 87 may store programs for processing or controlling by the controller 80, or may perform a function for temporarily storing inputted/outputted data (e.g., a phone book, a message, a still image, video, and the like). The memory 87 may include a detachable external memory 16 and an internal memory 88. For example the memory 87 may include at least one type of storage medium including a hard disk, a card-type memory (e.g., SD memory, DX memory, or the like), a flash memory, a Random Access Memory (RAM), a Read-Only Memory (ROM), and the like.

Mobile terminals according to the exemplary embodiments of the present invention have advantages over the related art. For example, the user can move the upper body with respect to the lower body to expose a camera disposed on the upper body, and, at the same time, expose at least one camera-dedicated key for manipulating the camera while holding the mobile terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
an upper body having an upper surface and a lower surface;
a display located at the upper body;
a lower body having first and second upper surfaces, the upper body being connected to the lower body for movement between a closed configuration in which the upper body completely covers the second upper surface and an open configuration in which the upper body partially covers the second upper surface to expose a portion of the second upper surface, the upper surface of the upper body being substantially co-planar to the first upper surface of the lower body in the open and closed configuration;
a first camera disposed at the lower surface of the upper body and accommodated within a space formed between the upper body and the lower body;
at least one camera-dedicated key located at said portion of the second upper surface exposed in the open configuration, the at least one camera-dedicated key being configured to control the first camera; and
a protrusion formed at the lower surface of the upper body so as to cover the space and extending more than the first camera such that the protrusion prevents the first camera from being in contact with an outer surface of the lower body.

2. The mobile terminal of claim 1, further comprising a controller configured to execute an image capturing mode when the upper body is moved from the closed configuration to the open configuration.

3. The mobile terminal of claim 2, wherein, when the mobile terminal is changed to the image capturing mode by controller, the display outputs an image captured by the first camera.

4. The mobile terminal of claim 2, further comprising a sensing unit configured to detect when the upper body moves between the closed and the open configuration, the sensing unit being in communication with the controller.

5. The mobile terminal of claim 4, wherein the sensing unit includes:
a magnet disposed on the upper body; and
a magnetic switch installed on the lower body, the sensing unit being configured to detect when the upper body is moved between the closed configuration and the open configuration by the proximity of the magnet to the magnetic switch.

6. The mobile terminal of claim 1, wherein the upper body is connected with the lower body such that the upper body is slidably moved in a widthwise direction of the mobile terminal.

7. The mobile terminal of claim 1, further comprising an elastic module located between the upper and lower bodies, the elastic module being configured to assist in moving the upper body between the closed configuration and the open configuration.

8. The mobile terminal of claim 1, further comprising a keypad for inputting characters or numbers located on the upper surface of the upper body.

9. The mobile terminal of claim 1, wherein the at least one camera-dedicated key includes:
a mode select dial rotatably located at said portion of the second upper surface exposed in the open configuration to select a usage mode of the camera; and
a zoom select switch located at said portion of the second upper surface exposed in the open configuration to be movable in two different directions from a center to implement a zoom-in/zoom-out operation of the camera.

10. The mobile terminal of claim 1, further comprising:
a connection key formed at one of the upper body and lower body, the connection key being configured to instruct the mobile terminal to connect to a website to wirelessly upload one of a photo image and a video image captured by the first camera.

11. The mobile terminal of claim 1, wherein the lower body includes a passage hole formed in a widthwise direction of the lower body, the passage hole being configured to receive said portion of the second upper surface therein when upper body moves from the open configuration to the closed configuration, and
wherein the upper body includes a slide support unit to be slidably moved along the passage hole.

12. The mobile terminal of claim 11, further comprising an elastic module located between the slide support unit and the lower body, the elastic module being configured to assist in moving the upper body between the open configuration and the lower configuration.

13. The mobile terminal of claim 12, wherein the elastic module comprises:
a first slide member connected to the slide support unit;
a second slide member connected the lower body, the second slide member cooperating with the first slide member such that the second slide member is slidable with respect to the first slide member; and
a spring unit disposed between the first and second slide members to assist in moving the upper body between the open configuration and the closed configuration.

14. The mobile terminal of claim 1, wherein the upper surface of the upper body and the first upper surface of the lower body are substantially co-planar.

15. The mobile terminal of claim 1, further comprising a second camera located at one of the upper body and the lower body.

16. The mobile terminal of claim 15, wherein the upper body includes a lower surface portion that is exposed when in the open configuration, the first camera being located on said lower surface portion.

17. The mobile terminal of claim 16, wherein the second camera is located at one of the first and second upper surfaces of the lower body.

18. The mobile terminal of claim 1, wherein the upper body includes a lower surface portion that is exposed when in the open configuration, the first camera being located on said lower surface portion.

19. The mobile terminal of claim 18, further comprising:
a first audio output unit on the first upper surface of the lower body; and
a second audio output unit located on said lower surface portion of the upper body.

20. The mobile terminal of claim 1, further comprising:
a first audio input unit on the first upper surface of the lower body; and
a second audio input unit located on a lower surface of the lower body.

21. The mobile terminal of claim 1, wherein, when the upper body is in the open configuration, the upper body and the lower body are disposed in a 'T' shape.

22. The mobile terminal of claim 1, wherein the at least one camera-dedicated key includes at least one zoom-in/zoom-out key.

23. A mobile terminal comprising:
an upper body having an upper surface and a lower surface;
a display located at the upper body;
a lower body having first and second upper surfaces, the upper body being connected to the lower body to be slidably movable in a widthwise direction of the mobile terminal for movement between a closed configuration in which the upper body completely covers the second upper surface and an open configuration in which the upper body partially covers the second upper surface to expose a portion of the second upper surface, the upper surface of the upper body being substantially co-planar with the first upper surface of the lower body in the open and closed configurations;
a camera disposed at the lower surface of the upper body and accommodated within a space formed between the upper body and the lower body;
at least one key located at said portion of the second upper surface exposed in the open configuration, the at least key being configured to manipulate the camera; and
a protrusion formed at the lower surface of the upper body so as to cover the space and extending more than the camera such that the protrusion prevents the camera from being in contact with an outer surface of the lower body.

24. The mobile terminal of claim 23, further comprising a controller configured to execute an image capturing mode when the upper body is moved from the closed configuration to the open configuration.

25. The mobile terminal of claim 24, further comprising a sensing unit configured to detect when the upper body moves between the closed and the open configuration, the sensing unit being in communication with the controller.

26. The mobile terminal of claim 23, wherein the upper body is connected with the lower body such that the upper body is slidably moved in a widthwise direction of the mobile terminal.

27. The mobile terminal of claim 23, further comprising an elastic module located between the upper and lower bodies, the elastic module being configured to assist in moving the upper body between the closed configuration and the open configuration.

28. The mobile terminal of claim 23, wherein the at least one key includes:
a mode select dial rotatably located at said portion of the second upper surface exposed in the open configuration to select a usage mode of the camera; and
a zoom select switch located at said portion of the second upper surface exposed in the open configuration to be movable in two different directions from a center to implement a zoom-in/zoom-out operation of the camera.

29. The mobile terminal of claim 23, wherein the lower body includes a passage hole formed in a widthwise direction of the lower body, the passage hole being configured to receive said portion of the second upper surface therein when upper body moves from the open configuration to the closed configuration, and
wherein the upper body includes a slide support unit to be slidably moved along the passage hole.

30. The mobile terminal of claim 23, wherein the upper body includes a lower surface portion that is exposed when in the open configuration, the first camera being located on said lower surface portion.

31. A mobile terminal comprising:
an upper body having an upper surface and a lower surface;
a display located at the upper body;
a lower body having first and second upper surfaces, the upper body being rotatably connected to the lower body for movement between a closed configuration in which a lower surface of the upper body completely covers the second upper surface and an open configuration in which the lower surface of the upper body partially covers the second upper surface to expose a portion of the second upper surface, the upper surface of the upper body being substantially co-planar to the first upper surface of the lower body in the open and closed configurations;
a first camera disposed at the lower surface of the upper body and accommodated within a space formed between the upper body and the lower body;
at least one key located at said portion of the second upper surface exposed in the open configuration, the at least key being configured to manipulate the first camera; and
a protrusion formed at the lower surface of the upper body so as to cover the space and extending more than the camera such that the protrusion prevents the camera from being in contact with an outer surface of the lower body.

32. The mobile terminal of claim 31, further comprising a controller configured to execute an image capturing mode when the upper body is moved from the closed configuration to the open configuration.

33. The mobile terminal of claim 31, wherein the at least one key includes:
a mode select dial rotatably located at said portion of the second upper surface exposed in the open configuration to select a usage mode of the camera; and
a zoom select switch located at said portion of the second upper surface exposed in the open configuration to be movable in two different directions from a center to implement a zoom-in/zoom-out operation of the camera.

34. The mobile terminal of claim 31, further comprising a second camera located at one of the upper body and the lower body.

35. The mobile terminal of claim 31, wherein the upper body includes a lower surface portion that is exposed when in the open configuration, the first camera being located on said lower surface portion.

36. The mobile terminal of claim 35, wherein the second camera is located the second upper surface of the lower body.

* * * * *